(12) United States Patent
Osawa et al.

(10) Patent No.: US 6,335,079 B1
(45) Date of Patent: *Jan. 1, 2002

(54) IONIZING RADIATION CURABLE RESIN COMPOSITION FOR FRESNEL LENS AND TRANSMISSION SCREEN

(75) Inventors: Futoshi Osawa, Shinjuku-Ku; Tomoaki Mukaiyama; Masayuki Mori, both of Yokohama, all of (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/257,267

(22) Filed: Feb. 25, 1999

(30) Foreign Application Priority Data

Feb. 26, 1998 (JP) .............................................. 10-045064

(51) Int. Cl.$^7$ ................................................ C08L 63/02
(52) U.S. Cl. .................. 428/141; 428/172; 428/156; 428/167; 522/91; 522/92; 522/96
(58) Field of Search .................................. 428/172, 156, 428/167, 141; 522/91, 92, 96

(56) References Cited

U.S. PATENT DOCUMENTS

| | | | | |
|---|---|---|---|---|
| 4,397,723 A | * | 8/1983 | Inoue et al. | 204/159.15 |
| 5,453,452 A | * | 9/1995 | Nakayama et al. | 522/92 |
| 5,714,218 A | * | 2/1998 | Nishio et al. | 428/64.1 |

* cited by examiner

*Primary Examiner*—William P. Watkins, III
(74) *Attorney, Agent, or Firm*—Parkhurst & Wendel, LLP

(57) ABSTRACT

Disclosed is an ionizing radiation curable resin composition is provided which is suitable for the production of optics, such as Fresnel lenses, with a high refractive index, possessing good scratch resistance. The ionizing radiation curable resin composition for a Fresnel lens comprises the following components (A) to (D), the radiation curable resin composition providing, upon curing, a cured product having a refractive index of not less than 1.55: A transmission screen prepared using the resin composition is also disclosed.

(A) A bisphenol A epoxy(meth)acrylate represented by chemical formula 1

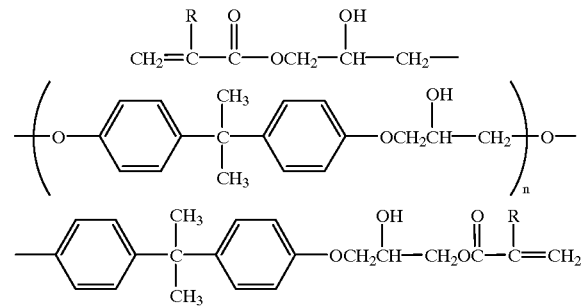

wherein R represents H or $CH_3$ and n is an integer of 1 or more;

(B) a monofunctional (meth)acrylate;
(C) a bifunctional (meth)acrylate; and
(D) a polymer.

4 Claims, 1 Drawing Sheet

IONIZING RADIATION CURABLE RESIN COMPOSITION FOR FRESNEL LENS AND TRANSMISSION SCREEN

TECHNICAL FIELD

The present invention relates to an ionizing radiation curable resin composition suitable for the production of optics such as Fresnel lenses. The present invention also relates to an ionizing radiation curable resin composition having excellent adhesion to substrates and a transmission screen having a Fresnel lens sheet provided with a Fresnel lens comprising a cured product of the ionizing radiation curable resin composition.

BACKGROUND OF THE INVENTION

Conventional transmission screens for projection televisions have, for example, a construction comprising a Fresnel lens sheet for transforming diffused light from light sources, such as CRT, to parallel light and transmitting the parallel light to a viewer, in combination with a lenticular lens sheet for distributing light only to the viewing range of the viewer in order to effectively utilize a given quantity of light.

In recent years, projection televisions have been more and more large-sized. In these projection televisions, in order to reduce the thickness of televisions per se, a lens sheet, with a short focal point, comprising a material having a high refractive index has been used as a Fresnel lens sheet to shorten the distance between the light source and the screen and to project light emitted from the light source onto the screen at a large angle and so as to minimize the reflection loss.

For the formation of lenses, with a high refractive index, having a short focal point for transmission screens, a resin sheet of a methyl methacrylate/styrene copolymer (refractive index n=1.56 to 1.57) prepared by copolymerizing highly transparent polymethyl methacrylate (refractive index n=1.49) with polystyrene having a high refractive index (refractive index n=1.59) or the like has been provided followed by molding of the surface of the sheet by heat pressing or the like into a Fresnel lens to prepare a Fresnel lens sheet.

The formation of large-area Fresnel lens sheets by the conventional heat pressing suffers from problems including that close temperature control in heating is necessary for reproduction of complicated surface shapes, molding is troublesome, and pressing and cooling require a lot of time leading to remarkably lowered productivity.

For this reason, a molding method alternative to the conventional heat pressing technique has been proposed wherein an ultraviolet curable resin is used to form a Fresnel lens on a substrate so that a Fresnel lens sheet can be efficiently formed in a short time simply by irradiation of the Fresnel lens with an ionizing radiation, such as ultraviolet light (Japanese Patent Laid-Open Publication No. 9301/1991).

In the case of conventional ionizing radiation curable resin compositions for Fresnel lenses, increasing the refractive index of cured products thereof increases the hardness of the cured products and results in lowered abrasion resistance. Therefore, in this case, when the lenticular lens sheet is used in combination with the Fresnel lens sheet, the surface of the Fresnel lens sheet is unfavorably scratched due to vibration and the like in transit to create scratch marks. On the other hand, adoption of a flexible composition from the viewpoint of enhancing the abrasion resistance of the surface of the Fresnel lens sheet results in a lowered refractive index. Thus, the conventional ionizing radiation curable compositions cannot simultaneously satisfy surface abrasion resistance and refractive index requirements.

Japanese Patent Laid-Open Publication No. 117348/1993 proposes a composition for solving the above problems. This composition, however, contains bromoacrylate from the viewpoint of improving the refractive index. This bromoacrylate is a halogen compound which, when burned as a waste, raises a problem of environmental protection. Further, this composition has low adhesion to the substrate of Fresnel lens sheets. Therefore, a primer layer should be provided in order to improve the adhesion to the substrate. This complicates the production process.

DISCLOSURE OF THE INVENTION

Accordingly, it is an object of the present invention to provide an ionizing radiation curable resin composition for a Fresnel lens that has high refractive index, possesses excellent abrasion resistance, and is used for the formation of Fresnel lens sheets having excellent adhesion to synthetic resin substrates. It is another object of the present invention to provide a transmission screen using the composition.

According to one aspect of the present invention, there is provided an ionizing radiation curable resin composition for a Fresnel lens, comprising the following components (A) to (D), said radiation curable resin composition providing, upon curing, a cured product having a refractive index of not less than 1.55:

(A) a bisphenol A epoxy(meth)acrylate represented by chemical formula 1

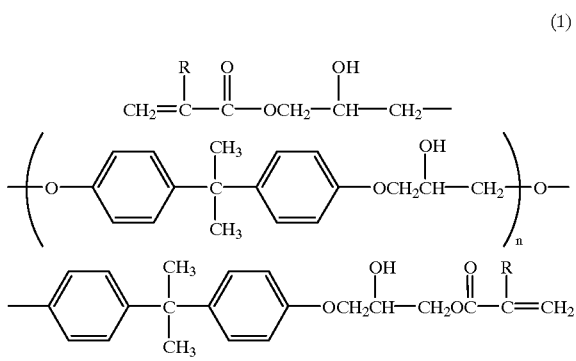

wherein R represents H or $CH_3$ and n is an integer of 1 or more;

(B) a monofunctional (meth)acrylate;
(C) a bifunctional (meth)acrylate; and
(D) a polymer.

Preferably, the composition of the present invention comprises 10 to 50 parts by weight of the bisphenol A epoxy (meth)acrylate, 10 to 50 parts by weight of the monofunctional (meth)acrylate, 10 to 50 parts by weight of the bifunctional (meth)acrylate, and 1 to 20 parts by weight of the polymer.

According to another aspect of the present invention, there is provided a transmission screen having a Fresnel lens sheet, the Fresnel lens sheet comprising a substrate, of a transparent resin composed mainly of methyl methacrylate, a polystyrene resin, or a polycarbonate resin, having thereon a Fresnel lens comprising a cured resin obtained by curing of the above composition.

DETAILED DESCRIPTION OF THE INVENTION

Figure 1:
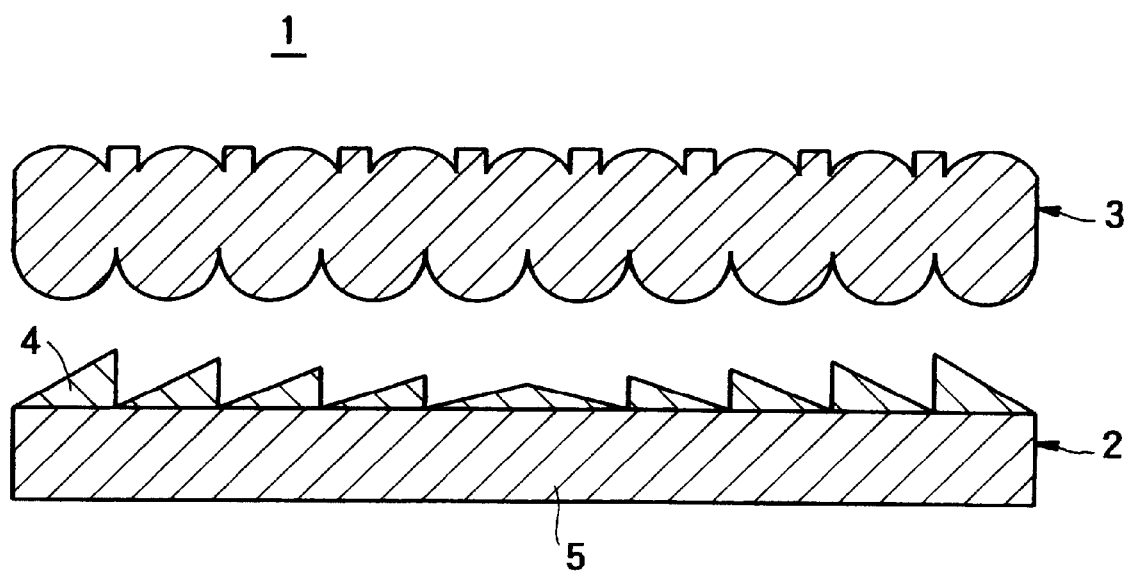
FIG. 1 is a cross-sectional view showing an embodiment of the transmission screen according to the present invention.

The present inventors have found that polymerization of a specific bisphenol A epoxy(meth)acrylate, a monofunctional (meth)acrylate, a bifunctional (meth)acrylate, and a polymer in the presence of a polymerization initiator and an additive(s) can provide a Fresnel lens possessing excellent abrasion resistance and adhesion to synthetic resin substrates while maintaining a high refractive index, which has led to the completion of the present invention.

The term "(meth)acrylate" used herein refers to a material containing any one of acrylate and methacrylate, or a material containing both acrylate and methacrylate. When the content of the bisphenol A epoxy(meth)acrylate (A) in the resin composition is 10 to 50 parts by weight, good curability and high refractive index can be maintained and, at the same time, the viscosity can be maintained at a value suitable for providing good workability. A compound (A) content of less than 10 parts by weight results in deteriorated curability, lowered refractive index, and lowered viscosity. On the other hand, a compound (A) content exceeding 50 parts by weight results in excessively high viscosity, deteriorated workability, and lowered adhesion to substrates.

In the compound (A), n is preferably 3 to 5, more preferably 4. When n is less than 3, the refractive index and the viscosity are lowered. In this case, the composition unfavorably provides a fragile cured product. On the other hand, when n exceeds 5, the viscosity is so high that the workability is unfavorably deteriorated. R preferably represents hydrogen from the viewpoint of curability.

The monofunctional (meth)acrylate (B) used in the present invention, when incorporated in an amount of 10 to 50 parts by weight in the resin composition, can provide a resin composition that maintains a high refractive index, maintains a viscosity suitable for offering good workability, and contributes to flexibility of cured products. A compound (B) content of less than 10 parts by weight results in high viscosity, poor flexibility, and unsatisfactory adhesion to base members. On the other hand, a compound (B) content exceeding 50 parts by weight results in lowered viscosity, deteriorated curability and removability from a mold for Fresnel lenses, and lowered refractive index.

Monofunctional (meth)acrylates usable herein include N-vinylpyrrolidone, tetrahydrofurfuryl acrylate, 2-hydroxyethyl (meth)acrylate, isobonyl acrylate, phenoxyethyl (meth)acrylate, phenyloxyethyl (meth)acrylate, 2-hydroxy-3-phenyloxypropyl (meth)acrylate, and 2-hydroxypropyl (meth)acrylate.

According to a preferred embodiment of the present invention, the bifunctional (meth)acrylate (C) is contained in an amount of 10 to 50 parts by weight in the resin composition. The compound (C), when incorporated in this amount range, can provide a resin composition which can maintain a high refractive index and a viscosity suitable for providing good workability and has improved adhesion to substrates. A compound (C) content of less than 10 parts by weight results in high viscosity, unsatisfactory adhesion to substrates, and deteriorated removability from molds. On the other hand, a compound (C) content exceeding 50 parts by weight unfavorably results in lowered viscosity and lowered refractive index.

Bifunctional (meth)acrylates usable herein include ethylene glycol di(meth)acrylate, bisphenol A tetraethoxydiacrylate, bisphenol A tetrapropoxydiacrylate, and 1,6-hexanediol diacrylate.

According to the present invention, the content of the polymer in the resin composition is preferably 1 to 20 parts by weight, more preferably 4 to 10 parts by weight. When the polymer content is in the above range, the resin composition has excellent adhesion to substrates and in addition contributes to flexibility of cured products. When the polymer content is less than 1%, the adhesion to substrates and the flexibility of cured products are unsatisfactory. On the other hand, a polymer content exceeding 20% results in high viscosity and lowered curability.

Examples of polymers usable herein include acrylic resin, urethane resin, epoxy resin, and polyester resin. When the flexibility is taken into consideration, urethane resin is preferred. The urethane resin preferably has a weight average molecular weight of 10,000 to 300,000 and a glass transition temperature (Tg) of −40° C. to 60° C., preferably has a weight average molecular weight of 180,000 to 230,000 and a Tg of −35° C. to −25° C.

A polymerization initiator is added to the resin composition of the present invention. The polymerization initiator may be any one commonly used in the polymerization of ionizing radiation curable resin compositions, and examples thereof include benzophenone, 1-hydroxycyclohexyl phenyl ketone, 2-hydroxy-2-methyl-1-phenyl-propan-1-one, and 2-methyl-1-[4-(methylthio)phenyl]-2-morpholinopropanone-1,2,4, 6-trimethylbenzoyldiphenylphosphine oxide.

The resin composition according to the present invention may contain various additives commonly used in synthetic resin compositions. Examples of such additives include plasticizers, leveling agents, antifoaming agents, release agents, polymerization inhibitors, ultraviolet absorbers, and antioxidants.

FIG. 1 is a cross-sectional view showing an embodiment of the transmission screen according to the present invention.

As shown in FIG. 1, a transmission screen lens 1 according to the present invention comprises a Fresnel lens 4 obtained by curing the ionizing radiation curable resin composition for Fresnel lenses according to the present invention. A Fresnel lens sheet 2 comprises a substrate 5 having thereon the Fresnel lens 4 prepared from the resin composition of the present invention.

Preferred substrates are sheets or films of transparent synthetic resins composed mainly of methyl methacrylate, polystyrene resin, and polycarbonate resin because they have the best adhesion to the resin of the present invention and hence can eliminate the need to provide a primer layer on the substrate. Transparent synthetic resins composed mainly of methyl methacrylate is more preferred because of high total light transmission.

The transmission screen 1 according to the present invention can be produced by, besides a combination of the Fresnel lens sheet with a lenticular lens sheet 3 as shown in FIG. 1, a combination of the Fresnel lens sheet with other lens sheets for screens.

In the production of the Fresnel lens sheet 2 using the resin composition of the present invention, the resin composition is first filled into a mold having a Fresnel lens face. Next, the substrate 5 is laminated onto the resin filled into the mold so that air bubbles are not included between the resin and the substrate 5. The assembly is then pressed and irradiated with an ionizing radiation, such as ultraviolet light, through the substrate 5 to cure the resin. The molded product is then removed from the mold.

Ionizing radiations usable for curing of the resin composition according to the present invention include ultraviolet light emitted from light sources, such as mercury lamps, carbon arcs, black light lamps, and metal halide lamps, and electron beams.

The following examples further illustrate the present invention.

b: Curability

Good: Surface of cured product is dry to the touch.

No good: Surface of cured product is sticky to the touch.

c: Adhesion to Substrate

Good: Not separated in cross-cut test

No good: Separated in cross-cut test

The cross-cut test was carried out by the cross-cut tape method according to the procedure set forth in JIS K 5400, 8.5.2.

d: Scratch resistance

Good: Scratch mark not left upon scratching with a nail

No good: Scratch mark left upon scratching with a nail

TABLE 1

| | Kind and content, parts by weight | | | | | | | | | Evaluation | | | | | |
| --- | --- | --- | --- | --- | --- | --- | --- | --- | --- | --- | --- | --- | --- | --- | --- |
| | Formula 1 | Monofunctional (meth)acrylate | | | Bifunctional (meth)acrylate | | Polymer | | Polymerization initiator | Viscosity | Curability | Adhesion to substrate | Removability from mold | Scratch resistance | Refractive index |
| | A1 | B1 | B2 | B3 | C1 | C2 | D1 | D2 | E1 | | | | | | |
| Ex. 1 | 20 | 10 | 20 | 9 | 20 | 15 | 3 | 3 | 1 | Excellent | Excellent | Excellent | Excellent | Excellent | 1.55–1.56 |
| Ex. 2 | 40 | 10 | 10 | — | 15 | 20 | 2 | 3 | 1 | Excellent | Excellent | Excellent | Excellent | Excellent | 1.55–1.56 |
| Ex. 3 | 30 | 10 | 20 | 10 | 17 | 10 | 3 | — | 1 | Excellent | Excellent | Excellent | Excellent | Good | 1.55–1.56 |
| Ex. 4 | 30 | 10 | 17 | 10 | 20 | 10 | — | 3 | 1 | Excellent | Excellent | Good | Excellent | Excellent | 1.55–1.56 |
| Comp. Ex. 1 | 5 | 10 | 35 | 10 | 20 | 20 | — | — | 1 | No good | No good | Excellent | Excellent | Excellent | Less than 1.55 |
| Comp. Ex. 2 | 30 | — | — | — | 40 | 30 | — | — | 1 | No good | No good | Excellent | Excellent | Excellent | 1.55–1.56 |
| Comp. Ex. 3 | 30 | 10 | 30 | 25 | — | — | 2 | 3 | 1 | No good | No good | Excellent | No good | Excellent | Less than 1.55 |
| Comp. Ex. 4 | 30 | — | — | — | 35 | 30 | 2 | 3 | 1 | Excellent | No good | Excellent | Excellent | Excellent | 1.55–1.56 |

EXAMPLES AND COMPARATIVE EXAMPLES

Ionizing radiation curable resin compositions for Fresnel lenses prepared according to formulations shown in Table 1 each were filled into a chromium-plated Fresnel lens mold having a size of 1 m in length×1 m in width. A substrate of a methyl methacrylate resin having a size of 1 m in length×2 m in width×2 mm in thickness (Sumipex HT, manufactured by Sumitomo Chemical Co., Ltd.) was pressure laminated onto the resin compositions in the mold so that air was not included between the substrate and the resin composition. The systems were irradiated with ultraviolet light at an exposure of 1500 $mJ/cm^2$ from a high pressure mercury lamp for 30 sec to cure the resin composition. Thereafter, the molded products were removed from the mold to obtain Fresnel lens sheets.

The resin compositions were evaluated for filling into the mold (workability), curability, adhesion to the substrate, and removability from the mold according to the following methods and criteria. Further, the Fresnel lens sheets were evaluated for scratch resistance and refractive index according to the following methods and criteria.
The results are summarized in Table 1.
Evaluation Methods and Criteria
 a: Viscosity
  Good: good filling into the mold
  No good: Unsatisfactory filling into the mold Note) Symbols in the table represents the following materials.
A1: Compound represented by chemical formula 1 wherein R=H and n=4
Monofunctional (meth)acrylate
 B1: Phenoxyethyl acrylate
 B2: 2-Hydroxy-3-phenyloxypropyl acrylate
 B3: Phenyloxyethyl acrylate
Bifunctional (meth)acrylate
 C1: Bisphenol A tetrapropoxy diacrylate
 C2: Ethylene glycol dimethacrylate
Polymer
 D1: Acrylic resin (polymethyl methacrylate, weight average molecular weight 95,000)
 D2: Polyester polyurethane resin (weight average molecular weight 220,000, Tg −20° C.)
Polymerization Initiator
 E1: 1-Hydroxy cyclophenyl ketone As is apparent from the results shown in Table 1, the samples of Examples 1 and 2 were evaluated as excellent for all the evaluation items.

As described above, the cured products obtained from ionizing radiation curable resin compositions for Fresnel lenses according to the present invention are flexible while maintaining high refractive index and hence have excellent abrasion resistance. Further, they have good adhesion to base members and have good viscosity, curability, and removability from molds in the production of cured products. Therefore, Fresnel lens sheets having short focal point can be obtained by a simple method wherein the composition is coated onto a substrate followed by exposure of the coating to an ionizing radiation. Since the Fresnel lens sheets are flexible, they have excellent abrasion resistance. Therefore, when they are used in combination with lenticular lens sheets, there is no possibility that the surface of Fresnel lenses is scratched due to vibration and the like in transit. This can eliminate the need to use a buffer oil, such as a silicone oil, for preventing friction. Further, since no harmful material is contained, incineration of wastes produces no harmful material and hence poses no problem associated with environmental protection. Furthermore, as described above, excellent adhesion of the ionization radiation curable composition to the substrate can eliminate the need to provide any primer layer on the substrate. This simplifies the production process.

According to the transmission screen of the present invention, a Fresnel lens having a short focal point can be formed to shorten the distance between the transmission screen and a light source. This particularly makes it possible to reduce the thickness and size of large projection televisions and also contributes to an increase in size of projection televisions.

What is claimed is:

1. An ionizing radiation curable resin composition for a Fresnel lens, comprising the following components (A) to (D), said radiation curable resin composition providing, upon curing, a cured product having a refractive index of not less than 1.55:

(A) a bisphenol A epoxy(meth)acrylate represented by chemical formula 1

(1)

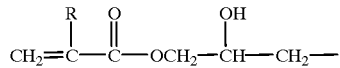

-continued

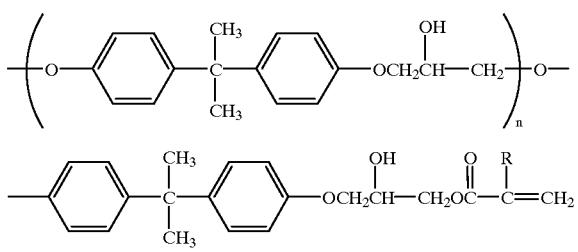

wherein R represents H or CH$_3$ and n is an integer of 1 or more;

(B) a monofunctional (meth)acrylate;

(C) a bifunctional (meth)acrylate; and (D) a polymer selected from the group consisting of a polymethyl methacrylate, a polyester polyurethane resin having a weight average molecular weight of 10,000 to 300,000, and a mixture thereof.

2. The composition according to claim 1, which comprises 10 to 50 parts by weight of the bisphenol A epoxy (meth)acrylate, 10 to 50 parts by weight of the monofunctional (meth)acrylate, 10 to 50 parts by weight of the bifunctional (meth)acrylate, and 1 to 20 parts by weight of the polymer.

3. A transmission screen comprising a Fresnel lens sheet, the Fresnel lens sheet comprising a substrate having thereon a Fresnel lens comprising a cured product of the composition according to claim 1.

4. The composition according to claim 1, wherein the polyester polyurethane resin has a weight average molecular weight of 180,000 to 300,000.

* * * * *